United States Patent [19]

Postma

[11] B 3,925,080

[45] Dec. 9, 1975

[54] MULTI-LAYERED PHOTOSENSITIVE MATERIAL HAVING GLASS SUBSTRATE AND METHOD OF MANUFACTURE

[75] Inventor: Lambertus Postma, Eindhoven, Netherlands

[73] Assignee: U.S. Philips Corporation, New York, N.Y.

[22] Filed: Jan. 24, 1973

[21] Appl. No.: 326,514

[44] Published under the Trial Voluntary Protest Program on January 28, 1975 as document no. B 326,514.

[30] Foreign Application Priority Data

Feb. 2, 1972 Netherlands ...................... 7201333

[52] U.S. Cl. ...................... 96/67; 96/48 PD; 96/49; 96/75; 427/165; 427/229; 428/209; 428/410; 428/464

[51] Int. Cl.[2] ...................... G03C 1/80; G03C 1/76

[58] Field of Search ............ 96/75, 67, 34.36, 36.2; 117/72, 124 E, 54, 34; 427/165, 229; 428/209, 410, 464

[56] References Cited

UNITED STATES PATENTS

| | | | |
|---|---|---|---|
| 2,598,453 | 5/1952 | Slifkin | 96/75 |
| 2,831,780 | 4/1958 | Deyrup | 117/54 |
| 2,898,496 | 8/1959 | Clark | 117/54 |
| 3,352,707 | 11/1967 | Pickard | 117/124 E |
| 3,352,708 | 11/1967 | Lyon et al. | 117/124 E |
| 3,441,424 | 4/1969 | Bolgiano | 117/72 |
| 3,522,075 | 7/1970 | Kiel | 117/72 |
| 3,554,787 | 1/1971 | Plymale | 117/72 |
| 3,674,484 | 7/1972 | Spinski | 96/34 |
| 3,743,491 | 7/1973 | Poole et al. | 117/124 E |
| 3,744,904 | 7/1973 | Loprest et al. | 96/36.2 |

FOREIGN PATENTS OR APPLICATIONS

| | | | |
|---|---|---|---|
| 1,001,007 | 8/1965 | United Kingdom | 96/75 |

*Primary Examiner*—Charles L. Bowers, Jr.
*Attorney, Agent, or Firm*—Frank R. Trifari; Norman N. Spain

[57] ABSTRACT

Photosensitive material consisting of glass on which a superficially saponified cellulose ester is provided through an intermediate layer consisting of an insoluble transparent metal oxide while the photosensitive compound is incorporated in the saponified layer.

2 Claims, No Drawings

MULTI-LAYERED PHOTOSENSITIVE MATERIAL HAVING GLASS SUBSTRATE AND METHOD OF MANUFACTURE

The invention relates to photosensitive material whose substrate consists of glass, and to a method of manufacturing said material.

Photosensitive layers on glass are known from, for example, the UK Pat. No. 1,001,007. A cellulose ester converted at the surface into regenerated cellulose is present on one or more intermediate layers present on the glass surface. The intermediate layers consist of, for example, tanned gelatin, on which a methylmethacrylate layer is provided, while the superficial regeneration of cellulose from the cellulose ester making it hydrophilic so that the photosensitive material can be introduced by means of an aqueous solution is brought about by saponification generally with an alcoholic alkalimetalhydroxide solution. The latter operation results in the initially satisfactory adhesion being affected in such a manner that the result is not satisfactory in practice.

Stringent requirements as regards adhesion are imposed, inter alia, on master negatives for photomasks. In the electronics industry photomasks are frequently used for the manufactuure of miniaturized circuits such as integrated circuits on semiconductor substrates, hybrid circuits of this kind, thin-film circuits, etc. The master negatives are generally obtained by optical diminution of a design drawn manually or mechanically and are used to make a large number of the actual masks.

As regards their adhesion the masks manufactured in known manner on glass leave much to be desired and in some cases cannot even be made as in the case of cellulose triacetate on glass. The margin of the degree of saponification is often greatly reduced by the choice of the substrate because it may also be saponified.

The invention provides a photosensitive material having an eminent adhesion of the photosensitive layer to the substrate consisting of glass, which adhesion is maintained in the manufacture of images therein or thereon and in which the degree of saponification of the hydrophilic layer can be chosen arbitrarily.

The photosensitive material consisting of glass on which a layer of a cellulose ester converted into regenerated cellulose through an intermediate layer to a depth of from 1 to 10 $\mu$m is provided, which regenerated cellulose contains a photosensitive compound is characterized in that the intermediate layer consists of an insoluble transparent film of a metal oxide having a thickness of not more than 1 $\mu$m.

The photosensitive compound which is incorporated in the regenerated cellulose layer may be chosen, inter alia, from the classes of photosensitive diazosulphonates and diazosulphides, a photosensitive ferric salt, an anthraquinone dye, a diazine, oxazine, thiazine derivate or a bipyridyl compound (French Pat. No. 2,072,400). Of these compounds some diazosulphides, anthraquinone sulphonic acids and bipyridyls are also sensitive to electron radiation.

The insoluble transparent film may consist of, inter alia, titanium dioxide, zirconium dioxide, indium oxide, tin dioxide, zinc oxide, etc.

A method of manufacturing photosensitive material according to the invention in which a layer of a cellulose ester is provided on an intermediate layer present on a glass substrate and in which the ester is superficially saponified to a depth of from 1 to 10 $\mu$m and the saponified layer is impregnated with a solution of a photosensitive compound is characterized in that the glass substrate is moistened with a solution of a metal compound capable of pyrolysis so as to obtain the intermediate layer and that the moistened substrate is subsequently heated to a temperature of at least 180°C.

It is to be noted that it is known per se to adhere all sorts of polymeric materials to glass by means of a metal oxide film. U.S. Pat. No. 3,522,075 describes the adhesion of an organopolysiloxane resin, the UK Pat. No. 1,068,899 describes the adhesion of an alkene polymer, a polyurethane or a polystyrene, U.S. Pat. No. 3,352,708 describes the adhesion of a polyvinyl alcohol and U.S. Pat. No. 3,554,787 describes the adhesion of a copolymer of vinyl acetate and ethylene. In these cases the use of the intermediate layer has for its object to obtain wear and scratch-resistant layers. The pyrolysis temperature required therefor is fairly high. However, a saponification reaction with a fairly strong alkali-hydroxide is not performed for any of these layers.

According to the invention a much lower pyrolysis temperature may be sufficient. This makes it possible to use cheap glass types having a lower softening point. For most oxides pyrolysis of the relevant metal compound capably of pyrolysis is performed in the temperature range of from 180° to 220 °C.

The invention will now be described with reference to some specific examples.

EXAMPLE I.

A glass plate is degreased by an ultrasonic treatment in a chromium acid-sulphuric acid mixture. The plate is rinsed and degreased in isopropanol vapour.

A 50 nm thick $TiO_2$ layer is provided on the glass surface by centrifuging with a 10 % solution of titanium acetyl acetonate in isopropanol and by heating for 30 minutes at 200 °C.

A saponifiable polymeric layer is provided by drawing the glass plate at a rate of 10 cm/min. from a 5% solution of cellulose triacetate in chloroform. This layer is dried for 30 minutes at 120°C. The layer thickness is then approximately 1.5 $\mu$m. Cellulose triacetate is commercially available under the name of Gevaloid.

The cellulose triacetate layer is subsequently completely saponified by treating it for 10 minutes with a 6.5 KOH solution in a water/methanol mixture (ratio 3:7). During saponification the plate is continuously moved.

The layer thus rendered hydrophilic is rinsed, first in water and then in ethanol. The layer is rendered photosensitive by immersing it in a solution comprising 0.1 molar 3.5 dichloro-4, dimethyl aminobenzene diazo-tertiary butyl sulphide in ethanol.

After the plate is saturated with this solution it is drawn out at a rate of 2.5 cms per minute. The plate is subsequently dried for 48 hours in a nitrogen atmosphere.

The plate is exposed for 5 seconds behind a negative with the aid of a 125 Watt HPR lamp at a distance of 60 cms. After the exposure the plate is immersed for 2 seconds in 0.01 M mercurous nitrate
0.01 M silver nitrate.

Subsequently rinsing takes place for 4 seconds in demineralized water and development is effected for 4 minutes in a physical developer having the following composition per litre:

0.01 n ferric nitrate
0.05 n ferrous ammonium sulphate
0.1 n citric acid
0.01 n silver nitrate
0.01 % by weight of Armac 12 D
0.02 % by weight of Lissapol N.

("Armac 12 D" is a cationic surface-active material 90 % of which consists of dodecyl amine acetate and the rest of which consists of higher alkyl amine acetates: "Lissapol N" is a non-ionic surface-active material which consists of a condensation product of alkyl phenol with ethylene oxide). A black internal image with D 5.0 is produced at the exposed areas.

The plate is rinsed in water so as to remove the developer, then in ethanol, so as to dissolve the photosensitive material not used, fixed, rinsed in water and dried.

The image layer thus obtained has an adhesion of more than 35 g/mm. When the adherent layer is not provided, the polymeric layer is loosened from the glass layer after saponification.

EXAMPLE II

A glass plate is degreased as in example I. A 5 nm thick $TiO_2$ layer is provided on the degreased glass surface by drawing it at a rate of 16 cm/min. from a 2% solution of isopropyl titanate in isopropanol. This layer is heated for 5 minutes at 200 °C. A saponifiable polymeric layer is provided by spraying the glass plate with a 4 % solution of cellulose acetobutyrate (commercially available as Tenite 2 from Eastman-Kodak) in methylglycolacetate. The layer thickness obtained after 30 minutes of heating at 70 ° C is 1.5 $\mu$m. The polymeric layer is then completely saponified by treating it for 4 minutes with a 6.5 % KOH solution in a water-methanol mixture (ratio 1 : 9). The plate is continuously moved during saponification.

The hydrophilic layer thus obtained is then rinsed in water and is rendered photosensitive by immersing it in a solution comprising 0.1 molar p-methoxybenzene diazosulphonate in water.

The results obtained therewith are equal to those according to example I.

EXAMPLE III.

A glass plate is degreased as in example I. A 10 nm thick $In_2O_3$ layer is formed on the glass surface by drawing it at a rate of 8 cm/min. from a solution which comprises 1 g $InCl_3$
2 ml concentrated HCl solution (d = 1.19)
97 ml ethanol and by subsequently heating the plate for 30 minutes at 200°C. A saponifiable polymeric layer is provided by drawing it from a 7% solution of cellulose acetobutyrate (commercial name EAB 381-20 of Eastman-Kodak) in methylglycol acetate at a rate of 2.5 cm/min. The layer is dried for 30 minutes at 120 °C. The layer thickness is 4.5 $\mu$m.

This layer is superficially saponified to 2 $\mu$m by treating it for 4 minutes with a 6.5 % KOH solution in a water/ethanol mixture (ratio 1:9). The plate is moved during saponification.

The hydrophilic layer is rinsed with demineralized water and is rendered photosensitive by immersing it in a 0.1 mol solution of the di-Na-salt of anthraquinone disulphonic acid 2.7 in water.

After 20 seconds of exposure by a 125 Watt HPR lamp at a distance of 60 cms a latent image consisting of nuclei is introduced by immersion for 5 seconds in a 0.01 M $AgNO_3$ solution in water.

The image formation and the quality of the adhesion are equal to those of example I.

EXAMPLE IV.

A glass plate is degreased as in example I. A 10 nm thick $ZrO_2$ layer is formed on the surface by drawing it at a rate of 8 cm/min. from a solution which comprises 1 g Zr $(NO_3)_4.5H_2O$
2 ml concentrated $HNO_3$ (d = 1.43)
97 ml ethanol, and by subsequently firing it for 30 minutes at 200°C. Provision of the polymeric layer and saponification are effected as described in example III.

After saponification the hydrophilized polymeric layer is rinsed with demineralized water and is rendered photosensitive by impregnating it with a 2 % solution of ferric ammonium citrate in water.

The introduction of nuclei and image formation are effected as in example III. The results are equivalent.

What is claimed is:

1. A method of manufacturing a photosensitive material comprising applying to a glass substrate a layer of less than 1 $\mu$ m of a metal compound capable of pyrolysis to a transparent insoluble metal oxide, heating the resultant moistened glass substrate to a temperature of from about 180°C to 220°C to thereby form an insoluble transparent layer of metal oxide on said glass substrate, applying a layer of a cellulose ester to said layer of metal oxide, saponifying said layer of cellulose oxide to a depth of from 1 to 10 $\mu$ and then impregnating the resultant saponified layer with a solution of a photosensitive compound.

2. A photosensitive material produced by the method of claim 1.

* * * * *

UNITED STATES PATENT AND TRADEMARK OFFICE

CERTIFICATE OF CORRECTION

PATENT NO. : 3,925,080

DATED : December 9, 1975

INVENTOR(S) : LAMBERTUS POSTMA

It is certified that error appears in the above-identified patent and that said Letters Patent are hereby corrected as shown below:

Column 4, line 44, change "moistened" to -- coated --.

Signed and Sealed this

*twelfth* Day of *July 1977*

[SEAL]

*Attest:*

RUTH C. MASON
*Attesting Officer*

C. MARSHALL DANN
*Commissioner of Patents and Trademarks*